United States Patent [19]

Buford

[11] Patent Number: 4,671,211
[45] Date of Patent: Jun. 9, 1987

[54] POWER SOURCE UTILIZING ENCAPSULATED LITHIUM PELLETS AND METHOD OF MAKING SUCH PELLETS

[75] Inventor: John T. Buford, Rockford, Ill.

[73] Assignee: Sundstrand Corporation, Rockford, Ill.

[21] Appl. No.: 733,049

[22] Filed: May 13, 1985

Related U.S. Application Data

[63] Continuation-in-part of Ser. No. 618,893, Jun. 8, 1984, Pat. No. 4,634,479.

[51] Int. Cl.$^4$ ............................................... F22B 1/00
[52] U.S. Cl. ..................................... 122/4 R; 122/21; 427/216
[58] Field of Search ................... 122/4 R, 4 D, 21; 126/263; 149/19.3; 60/39.05; 427/216; 165/1

[56] References Cited

U.S. PATENT DOCUMENTS

| | | |
|---|---|---|
| 3,379,178 | 4/1968 | Boyars et al. . |
| 3,405,070 | 10/1963 | Reyes . |
| 3,447,532 | 6/1969 | Poppendier ..................... 126/263 |
| 3,639,306 | 2/1972 | Sternberg et al. . |
| 3,788,955 | 1/1974 | Crites et al. . |
| 3,791,889 | 2/1974 | Schroder ........................ 149/19.3 |
| 3,843,557 | 10/1974 | Fanger et al. . |
| 3,884,216 | 5/1975 | McCartney ..................... 126/263 |
| 3,909,444 | 9/1975 | Anderson et al. . |
| 4,016,099 | 4/1977 | Wellman et al. . |
| 4,325,355 | 4/1982 | Houser ........................... 122/21 X |

Primary Examiner—Edward G. Favors
Attorney, Agent, or Firm—Wood, Dalton, Phillips, Mason & Rowe

[57] ABSTRACT

A heat exchanger (16) for a thermal power source includes a chamber provided with an igniter and a reactant inlet. Within the chamber is a mass of lithium pellets, each provided with a coating.

13 Claims, 4 Drawing Figures

POWER SOURCE UTILIZING ENCAPSULATED LITHIUM PELLETS AND METHOD OF MAKING SUCH PELLETS

CROSS REFERENCE

This application is a continuation-in-part of my application Ser. No. 618,893, entitled POWER SOURCE UTILIZING ENCAPSULATED LITHIUM PELLETS AND METHOD OF MAKING SUCH PELLETS, filed June 8, 1984, now U.S. Pat. No. 4,634,479, and assigned to the same assignee as the instant application.

FIELD OF THE INVENTION

This invention relates to a power or heat source wherein lithium pellets encapsulated in a predominantly fluorine substituted polymeric material are oxidized to provide heat and a method of making such encapsulated pellets along with the power source.

BACKGROUND ART

Over the years a variety of power or energy sources operating off of heat derived from the oxidation of metallic lithium have been proposed. See, for example, U.S. Pat. No. 3,328,957 issued July 4, 1967 to Rose. In such a system, water and lithium are reacted to produce lithium hydroxide, hydrogen and steam. Elsewhere in the system, the hydrogen generated by the reaction between lithium and water is combined with oxygen to provide additional steam. The steam is then utilized to drive a turbine or the like to provide a source of power.

More recently, somewhat similar systems have been proposed wherein metallic lithium, in the solid phase, is placed within an oxidation chamber of a boiler. When power is desired, the lithium is melted and oxidized with sulfur hexafluoride. The resulting heat vaporizes a working fluid, typically water, in a working fluid chamber in heat exchange relation with the oxidation chamber of the boiler. Again, a turbine may be driven by the working fluid.

While such a system is effective, it is not without its drawbacks. Typically, the system start is initiated by firing a thermal starting device which includes aluminum potassium perchlorate. The intention is to heat the thermal mass of the boiler and the lithium fuel therein to operating temperature and to this end, the aluminum potassium perchlorate generates extremely high temperatures, typically in the range of 5400°–8500° F. Substantial pressures may be generated during the ignition of the aluminum potassium perchlorate requiring high strength of the boiler structure. Furthermore, the aluminum potassium perchlorate, should it contact boiler surfaces or sulfur hexafluoride injection nozzles, can burn through the same resulting in system damage.

In my above referenced pending patent application, the details of which are herein incorporated by reference, there is described a power source which primarily operates as a result of heat generated by a lithium-sulphur hexafluoride reaction which avoids the difficulties occasioned by the use of aluminum potassium perchlorate or other like starters. In particular, lithium pellets are encapsulated within a predominantly fluorine substituted polymeric material. Such encapsulated pellets are then disposed within the boiler of the power source. A relatively low temperature thermal starting device can be utilized to initiate a reaction between the lithium metal and the polymeric coating simply by raising the temperature of a relatively few of the pellets to approximately the melting point of lithium, namely, 357° F. This initial reaction heats the remainder of the mass while generating lithium fluoride and lithium-carbon compounds. Sulfur hexafluoride, after the initial reaction has been initiated, is then admitted to the boiler, generally in a controlled fashion, to maintain a reaction with the lithium, again generating lithium fluoride and in addition, lithium sulfide.

The system works very well for its intended purpose and avoids the problems heretofore associated with power sources utilizing a lithium-sulphur hexafluoride reaction to provide heat. However, the method of encapsulating the lithium pellets described in my co-pending application requires the transfer of lithium pellets from a coating apparatus to the boiler after the pellets have been encapsulated and this step desirably would be eliminated.

The present invention is directed to accomplishing just that.

SUMMARY OF THE INVENTION

It is the principal object of the invention to provide a new and improved thermal power source. More specifically, it is an object of the invention to provide a thermal power source including a heat exchanger with a chamber in which is disposed a plurality of lithium pellets, the lithium pellets being coated in situ with a predominantly fluorine substituted hydrocarbon. It is also an object of the invention to provide a method of making such a power source.

An exemplary embodiment in the invention contemplates a heat exchanger including a heat exchanger housing with a closeable chamber. An ignition device is disposed within the chamber and there is also provided a reactant inlet to the chamber. Within the chamber is a mass of lithium pellets which are coated in situ with the predominantly fluorine substituted hydrocarbon material.

According to a preferred embodiment of the invention, the material is a polymer or a telomer.

The invention contemplates that the pellets be nominally spherical and of at least two substantially differing diameters.

In a highly preferred embodiment, the diameters are chosen so as to provide a predetermined void volume as a result of voids between the pellets. The preferred diameter ratio is 20:1 where pellets of two different diameters are used.

According to the invention, the lithium pellets may be introduced into the container or chamber of the heat exchanger forming part of the power source. There is also introduced into the container, a predominantly fluorine substituted hydrocarbon usually in a solvent.

Thereafter, the solvent is evaporated to provide the lithium pellets with a coating of the predominantly fluorine substituted hydrocarbon as well as voids within the container as a consequence of the removal of the solvent.

In a preferred embodiment, the container is a boiler. The invention contemplates that the steps of introducing the predominantly fluorine substituted hydrocarbon in a solvent and the evaporation of the solvent may be sequentially repeated until the desired amount of the predominantly fluorine substituted hydrocarbon has built up on the pellets.

In a highly preferred embodiment, after the coated pellets have been formed within the container, the voids within the container are backfilled with sulfur hexafluoride, after which the container is sealed.

Other objects and advantages will become apparent from the following specification taken in connection with the accompanying drawings.

DESCRIPTION OF THE PREFERRED EMBODIMENT

Figure 1:
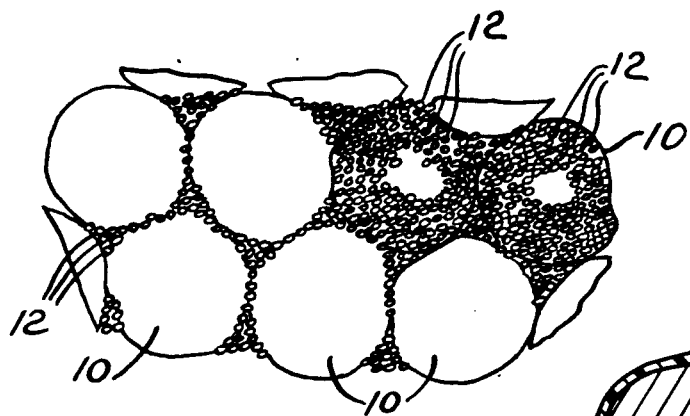
FIG. 1 is a fragmentary view of a mass of lithium pellets embodied in the invention.

A mass of lithium fuel pellets made according to the invention is illustrated in FIG. 1 and is seen to be made up of a plurality of relatively large metallic lithium pellets 10 which are nominally spherical in shape. The pellets 10 are in substantial abutment with each other and in the spaces between the large pellets 10 are a plurality of smaller pellets 12 of metallic lithium and which are also nominally spherical in shape.

The pellets 10 and 12 may be formed in any suitable fashion, although given the reactivity of lithium, care must be taken. By way of example, one means by which the pellets 10 and 12 may be formed is by forming drops or droplets of molten lithium metal in a suitable inert atmosphere and dropping them through an inert atmosphere into an inert coolant which could be, for example, mineral oil or a liquified inert gas in the periodic table such as Argon. If formed in this manner, it will be readily appreciated that the pellets 10 and 12 will not have the shape of a true sphere.

Any other desired method may be utilized to form the pellets 10 and 12 as nominal spheres (including polyhedrons with a large number of faces), so long as when the pellets are combined into a mass, there will be void spaces between them.

Figure 2:
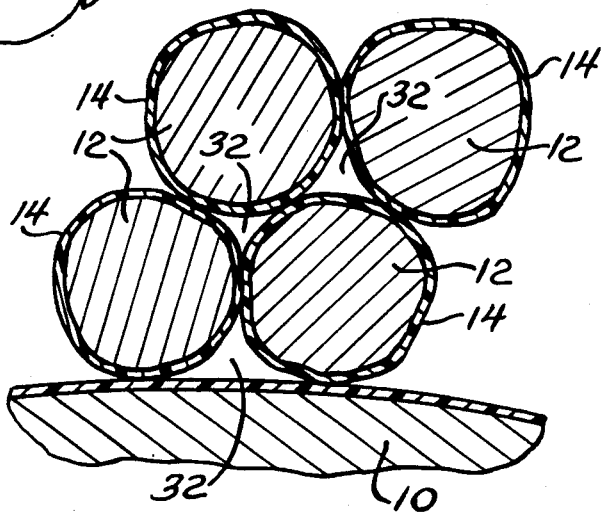
FIG. 2 is an enlarged, fragmentary view of the mass of pellets.

As seen in FIG. 2, each of the pellets 10 and 12 is encapsulated in or provided with a coating of predominantly fluorine substituted hydrocarbon material. In the usual case, the hydrocarbon material will be a polymer (including telomers), although non-polymers may be used in some instances if they are sufficiently viscous as to remain on the individual pellets for the desired shelf life of the thermal power source in which they are used.

By "predominantly fluorine substituted" it is intended that generally speaking, approximately 70–75% or more of the hydrogen atoms of the basic hydrocarbon will be substituted for by other components, usually fluorine. Typical commercially available materials that may be employed in the invention are those sold under the registered trademark Teflon such as polytetrafluoroethylene and polyperfluoroalkoxy compounds. A particularly preferred compound is that sold under the registered trademark Vydax, and specifically, Vydax 550. This material is understood to be a fluorine end capped tetrafluoroethylene telomer dispersed in a trichlorotrifluoroethane solvent. The identified materials are commercially available from E. I. DuPont de Nemours Inc. of Wilmington, Del.

The coating 14 must be applied to the lithium at a temperature below the melting point of lithium which is approximately 357° F. since indications are that typical coating materials as those mentioned above will begin to react with lithium when lithium enters the liquid phase. Consequently, application is made preferably at temperatures below 300° F. to provide a desired safety margin.

Figure 3:
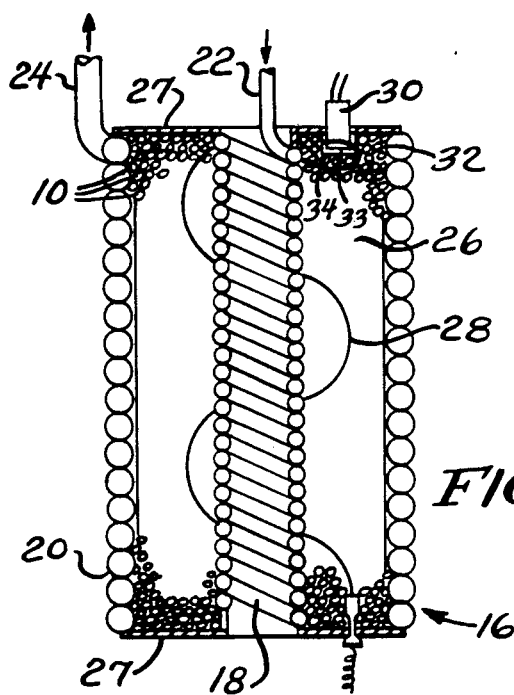
FIG. 3 is a sectional view of a heat exchanger made according to the invention.

According to the invention, the coating 14 is applied to the mass of pellets within a container or housing in which the lithium is to ultimately be reacted. FIG. 3 illustrates such a container or housing in the form a heat exchanger, generally designated 16. The heat exchanger 16 includes an interior wall defined by a small diameter coiled tube 18 surrounded by a large diameter coiled tube 20. The tubes 18 and 20 are in fluid communication with the tube 18 provided with a water inlet 22 and the tube 20 provided with a steam outlet 24. The annulus 26 between the tubes 18 and 20 is sealed by any suitable means including, for example, end plates 27. The resulting structure defines a boiler in which a working fluid, such as water, may be introduced through the inlet 22 and evaporated by the heat of the chemical reaction occurring within the annulus 26 to steam which exits the outlet 24 to be conveyed to a point of use as, for example, a turbine.

With one of the end plates 27 removed, the heat exchanger 16 includes an opening through which the lithium pellets 10 and 12 may be introduced. Also within the annulus 26 is a relatively low temperature thermal starting device 28 which may be formed of, for example, so-called "SCID" wire. Also disposed within the annulus 26 and shown schematically is a reactant inlet 30 through which material, typically sulfur hexafluoride, may be introduced into the annnulus 26 to react with the lithium therein.

As pointed out in my previously referenced copending application, to initiate operation of the power source, the starter 28 is fired. This will cause adjacent ones of the pellets 10 or 12 to be elevated in temperature above their melting point, at which time, the lithium will react with the coating 14 generating sufficient heat to propagate the reaction throughout the annulus 26. Sulfur hexafluoride is then supplied, in a controlled fashion, to the annulus 26 via the reactant inlet 30 to maintain the reaction at a desired rate.

Figure 4:
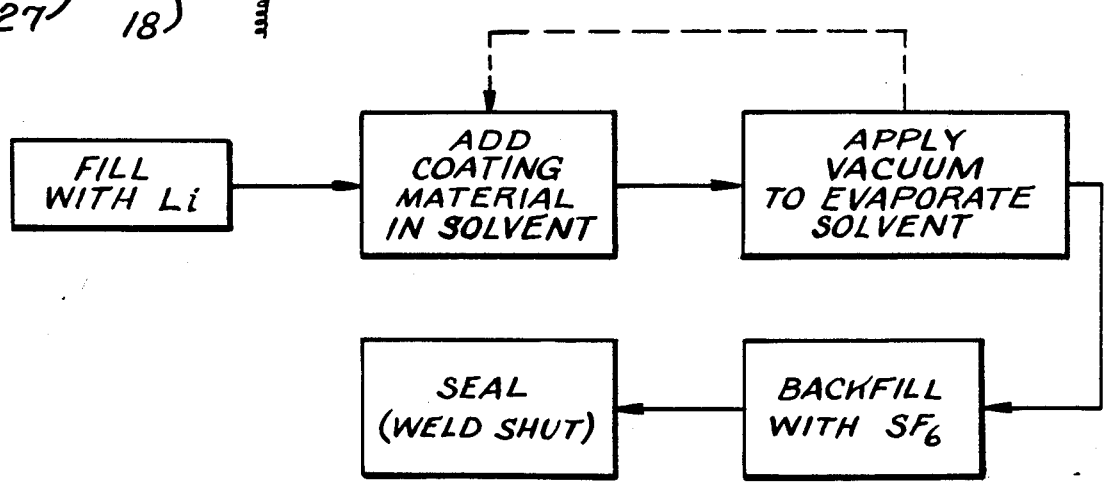
FIG. 4 is a block diagram of a method of manufacturing the heat exchanger shown in FIG. 3 according to the invention.

According to the invention, the coating 14 on the lithium pellets 10 and 12 is formed, in situ, within the housing 18. The pellets 10 and 12 are introduced into the annulus 26 before application of one of the end plates 27 as shown at step A in FIG. 4. In a preferred embodiment, the large pellets 10 are introduced first, followed by the introduction of the small pellets 12.

Thereafter, the predominantly fluorine substituted material, in a solvent, is introduced into the annulus 26 to fill the same as shown at step B. In a preferred embodiment, a 5% solution of Vydax 550 in freon is employed.

The freon is then evaporated under a vacuum as, for example, 10 inches of mercury, absolute as shown in step C. There are no important constraints on the rate of evaporation since blistering of the coating 14 is not of concern with the pellets 10 and 12 already in the annulus 26. This is due to the fact that the coated pellets do not require subsequent handling following coating to introduce them into the annulus 26.

The step of introducing the predominantly fluorine substituted hydrocarbon in a solvent, step B, and the subsequent step of evaporating the solvent, step C, may be performed repeatedly until the total mass of the coating 14 relative to the mass of the pellets 10 and 12 is stoichiometrically correct. When the procedure is halted, because solvent has been removed from the annulus 26, there will exist a plurality of void spaces 32 (FIG. 2) between adjacent ones of the pellets 10 and 12.

In one embodiment of a thermal power source, the main reaction, that is, the reaction of lithium with sulfur hexafluoride, is intended to occur at about 2000° F. In order to avoid the existence of rupturing forces applied to the heat exchanger as a result of thermal expansion of the lithium therein as its temperature is raised from the ambient to the reaction temperature of 2000° F., a ullage (total void space) of 19–20% of the oxidation chamber formed by the annulus 26 is necessary. It has been found that this can be obtained by forming the large pellets 10 to have a nominal diameter of approximately twenty times the nominal diameter of the small pellets 12. As a consequence, during the reaction, as the lithium heats up and expands, it will expand into this void space and will not apply rupturing forces of any consequence to the heat exchanger 16.

Returning to FIG. 4, following the last performance of the step of evaporating the solvent, shown at step C, a backfilling step shown at D is performed. The backfilling step simply requires that all of the voids 32 be filled with gaseous sulfur hexafluoride which may be introduced into the housing 18 through either inlet 26 or 30.

Thereafter, the remaining end plate 27 is employed to close the inlet 26 and the same is sealed as, by welding, with care being taken to avoid heating any part of the contents of the housing 18 to a temperature about 357° F. The step of sealing is shown at E in FIG. 4. Step D is performed for safety purposes in the event there is an inadvertent initiation of the reaction during the performance of step E. In particular, when lithium begins to react with sulfur hexafluoride, there is a negative pressure spike. Thus, should inadvertant ignition occur during the performance of step E, the pressure within the housing 18 will be lowered as a result of the negative pressure spike to prevent an explosion.

In a highly preferred embodiment, nozzles 33 on the sulfur hexafluoride inlet 30 are closed with caps 34 which are soldered in place with 450° F. solder to seal the same. The SCID wire used as an igniter 28 is then wrapped around the caps 34 at the solder interface. Consequently, when ignition is desired, the SCID wire will melt the solder to release the caps 34, usually about 50 milliseconds after ignition to allow maintenance of a controlled reaction through the controlled admittance of sulfur hexafluoride to the interior of the housing 18.

The present invention has a number of improvements over that disclosed in my previously referenced co-pending application. For one, the coating of the lithium pellets in situ within the heat exchanger eliminates handling of the pellets between the coating step and their introduction into the heat exchanger. This in turn allows the evaporating of the solvent to be performed with fewer constraints employed to avoid blistering since blistering no longer poses a problem.

Furthermore, the use of pellets of differing sizes, particularly small pellets as the pellets 12 results in extremely high surface to volume ratio which in turn fosters rapid propagation of the reaction upon ignition. In this respect, pellet sizes may range from 1 to 25 millimeters. And, the selection of a desired ratio of nominal diameters from the large pellets to the small can be utilized to achieve a desired packing density through which thermal expansion of the lithium can be compensated for.

I claim:

1. A heat exchanger for a thermal power source comprising a heat exchanger housing including a closeable chamber, an ignition device in said chamber, a reactant inlet to said chamber, and a mass of coated lithium pellets in said chamber and formed by placing the pellets in the chamber, introducing a predominantly fluorine substituted hydrocarbon in a solvent into the chamber and evaporating the solvent and removing it from the chamber.

2. The heat exchanger of claim 1 wherein the chamber is closed and sealed following the evaporation of the solvent.

3. The heat exchanger of claim 2 wherein the chamber is backfilled with sulfur hexafluoride after the evaporation of the solvent and before the closing and sealing of the chamber.

4. The heat exchanger of claim 1 wherein the pellets are nominally spherical.

5. The heat exchanger of claim 1 wherein said pellets are sized and shaped to provide a predetermined void volume within said chamber when substantially filled with said pellets.

6. A heat exchanger for a thermal power source comprising a heat exchanger housing including a closable chamber, an ignition device in said chamber, a reactant inlet to said chamber, and a mass of coated lithium pellets in said chamber and formed by placing the pellets in the chamber, introducing a predominantly fluorine substituted hydrocarbon in a solvent into the chamber, and evaporating the solvent and removing it from the chamber, said pellets being sized and shaped to provide a predetermined void volume within said chamber when substantially filled with said pellets, said pellets being nominally spherical and of at least two substantially differing nominal diameters.

7. A heat exchanger for a thermal power source comprising a heat exchanger housing including a closeable chamber, an ignition device in said chamber, a reactant inlet to said chamber and a mass of lithium pellets in said chamber and coated in situ with a predominantly fluorine substituted hydrocarbon material.

8. A heat exchanger for a thermal power source comprising a heat exchanger housing including a closable chamber, an ignition device in said chamber, a reactant inlet to said chamber, and a mass of lithium pellets in said chamber and coated with a predominantly fluorine substitued hydrocarbon material said pellets being nominally spherical and of at least two substantially differing diameters.

9. The heat exchanger of claim 8 wherein said material is a polymer or a telomer.

10. A heat exchanger for a thermal power source comprising a heat exchanger housing including a closable chamber, an ignition device in said chamber, a reactant inlet to said chamber, and a mass of lithium pellets in said chamber and coated in situ with a predominantly fluorine substituted hydrocarbon material said reactant inlet being closed with a cap, said cap being held in place with a fusable material melting at an elevated temperature less than the temperature generated by said ignition device, said ignition device being in heat transfer relation with said fusable material, whereby operation of said ignition device will melt said fusable material to release said cap from said inlet.

11. The heat exchanger of claim 10 wherein said inlet is a nozzle and said fusable material is a solder.

12. The heat exchanger of claim 10 wherein said ignition device is a wire-like igniter and is wrapped around at least one of said cap and said inlet adjacent said fusable material.

13. A heat exchanger for a thermal power source comprising a heat exchanger housing including a closable chamber, an ignition device in said chamber, a oxidant inlet to said chamber, and a mass of oxidizable material in said chamber, said oxidant inlet being closed with a cap, said cap being held in place with a fusable material melting at an elevated temperature less than the temperature generated by said ignition device, said ignition device being in heat transfer relation with said material, whereby operation of said ignitiono device will melt said material to release said cap from said inlet.

* * * * *